United States Patent [19]
Culver

[11] 3,752,988
[45] Aug. 14, 1973

[54] CIRCUIT FOR REDUCING PULSE PILE-UP IN PULSE DETECTION SYSTEMS

[75] Inventor: Richard B. Culver, Houston, Tex.

[73] Assignee: Dresser Industries, Inc., Dallas, Tex.

[22] Filed: June 1, 1971

[21] Appl. No.: 148,765

[52] U.S. Cl. .............................. 250/270, 250/363
[51] Int. Cl. ............................................ H01j 39/30
[58] Field of Search ................. 250/83.6 W, 83.3 R; 307/232, 234, 260; 328/59, 109

[56] References Cited
UNITED STATES PATENTS

| | | | |
|---|---|---|---|
| 3,309,521 | 3/1967 | Bargainer...................... | 250/83.6 W |
| 3,435,224 | 3/1969 | Zemanek...................... | 250/83.6 W |
| 3,559,163 | 1/1971 | Schwartz........................ | 250/83.6 W |
| 3,275,826 | 9/1966 | Leiter............................. | 250/83.3 R |

Primary Examiner—James W. Lawrence
Assistant Examiner—D. C. Nelms
Attorney—Robert W. Mayer, Thomas P. Hubbard, Jr., Daniel Rubin, Raymond T. Majesko, Roy L. Van Winkle, William E. Johnson, Jr., Eddie E. Scott and Morgan L. Crow

[57] ABSTRACT

The amplified pulses from a radioactivity detector are coupled to a discriminator and via a 400 nanosecond delay line to the inputs of three linear gates. The discriminator is AND gated with a clock pulse and a J-K flip-flop. A scale of four and a 1 of 4 decoder and a single shot multivibrator are driven by the AND gate output. The single shot output and the decoder outputs are AND gated to control the linear gates.

In an alternative embodiment, the linear gates and delay lines are replaced with charge and hold, delay and interrogate circuits.

15 Claims, 2 Drawing Figures

INVENTOR
RICHARD B. CULVER

CIRCUIT FOR REDUCING PULSE PILE-UP IN PULSE DETECTION SYSTEMS

RELATED APPLICATIONS

This application relates to my co-pending application, Ser. No. 146,261, filed May 24, 1971, entitled CIRCUIT FOR IMPROVING DATA IN PULSE DETECTION SYSTEMS, and to my concurrently filed co-pending application Ser. No. 148,754, filed June 1, 1971, entitled CIRCUIT FOR REDUCING PULSE PILE-UP IN PULSE DETECTION SYSTEMS BY CONVERTING A RANDOM PULSE TRAIN TO THAT OF FIXED FREQUENCY.

BACKGROUND OF THE INVENTION

This invention relates generally to the art of geophysical prospecting and more particularly to the art of radioactivity well logging involving the counting of pulses resulting from the detection of such radioactivity.

As is well known in the art of radioactivity well logging, the detection of gamma rays from the inelastic scattering of fast neutrons is generally accomplished by pulsing a scintillation detector coincidentally with a fast neutron source. The difficulties involved in this measurement are numerous, not the least being the slow rate of accumulating data.

Sodium iodide detectors are normally used in subsurface spectral measurement systems because they offer the best compromise of physical and electrical characteristics. Good linearity and resolution can be obtained with detector output pulse widths of about 1.2 microseconds. However, when the pulses are transmitted over a well logging cable, any pulse arriving at the surface for analysis will have been spread in time to about 10 microseconds by its transit over the 4 miles of cable that typically separates the surface and subsurface systems.

The fast multichannel analyzers that are presently available have pulse pair resolving times of about 15 microseconds for pulses of this width. The maximum pulse rate will be less than the detector pulsing frequency if good resolution is maintained. This is due to the statistical nature of the data; as the average data rate approaches the pulsing frequency, the probability of a second detector pulse occurring during the detector gating interval becomes large, and the pulse spectrum is distorted due to pulse pile-up on the line.

It is therefore the primary object of the present invention to provide a circuit which substantially reduces the problem of pulse pile-up on the line; and It is another object of the invention to provide a new and improved circuit for preventing pulse pile-up on the line by delaying the processing of any pulses that would otherwise follow too soon after any given pulse.

SUMMARY OF THE INVENTION

The objects of the invention are accomplished, broadly, by a circuit which utilizes a combination of energy discrimination and delay logic for eliminating pulse pile-up by delaying the processing of any pulses that would otherwise follow too soon after any given pulse.

These and other objects, features and advantages of the invention will become apparent to those skilled in the art from the following detailed description, when considered with the accompanying drawing, in which.

Figure 1:
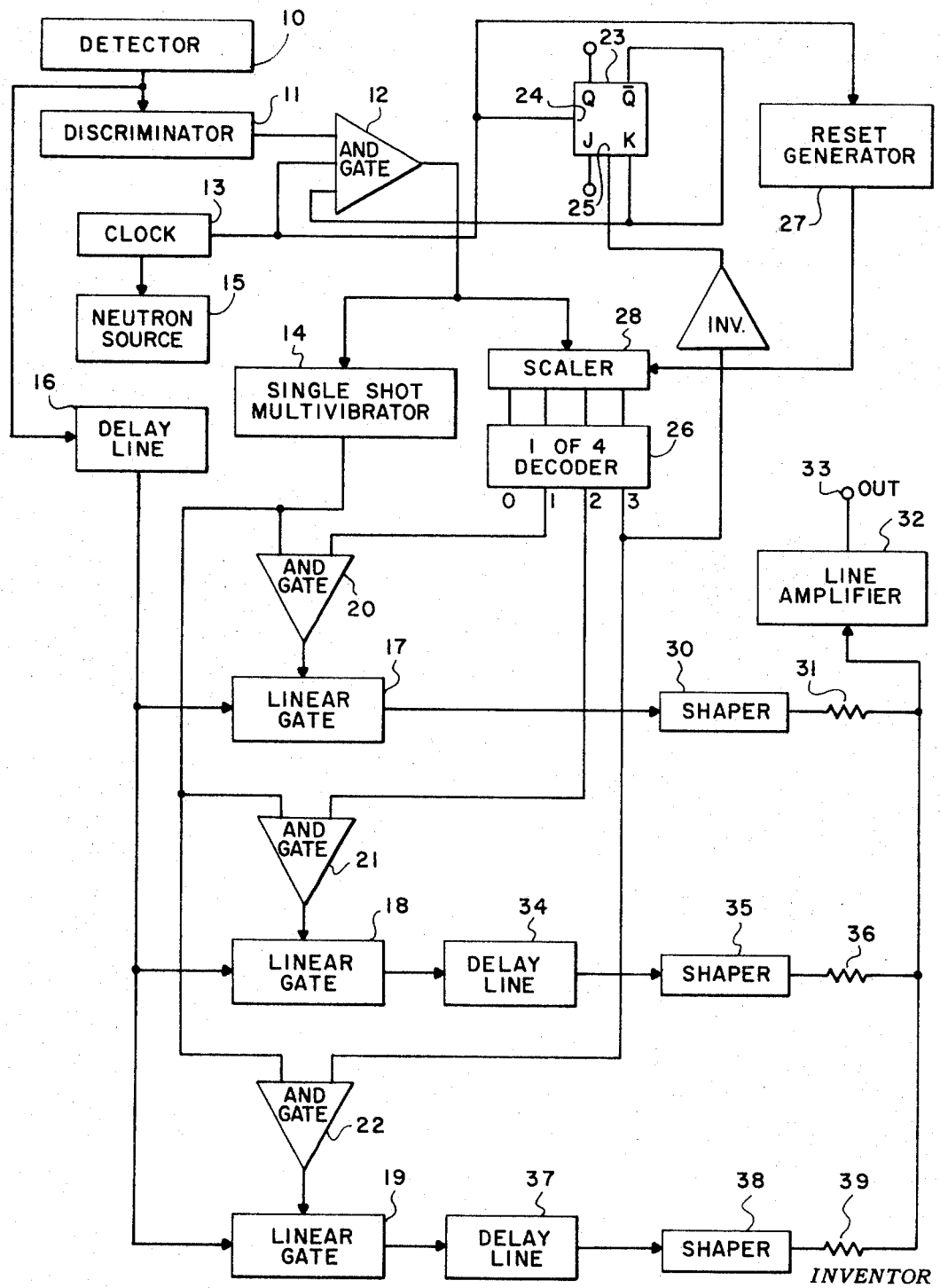
FIG. 1 is a block circuit diagram of one embodiment of the invention.

Referring to the drawing in more detail, particularly to FIG. 1, there is illustrated in block diagram a circuit which can be used to aid in reducing the probability of pulse pile-up within instrumentation which is used in conducting a radio-activity well survey. It should be appreciated that the circuits embodied herein find utility in my above-referenced co-pending applications and the disclosure of such applications is incorporated herein by reference.

The detector 10, which may be used in a well logging instrument not illustrated, is a scintillation counter arranged for gamma ray spectral analysis in accordance with prior art. In the preferred embodiment, it is a NaI (T1) crystal having a 2 inch diameter with a 3 inch length, such crystal being coupled to a Model No. 4518 photomultiplier tube available from the Radio Corporation of America. Such a crystal-photomultiplier combination may have a resolution of 7.5 to 8.5 percent with a 660 kev cesium 137 peak. The output of the detector 10 is coupled into a discriminator 11, which in turn is coupled into one of the three inputs to the AND gate 12. The discriminator 11 is used to remove pulses having amplitude below a selectable threshold value which might otherwise cause pile-up on the transmission line normally connected to the output terminal 33. A setting of 400 kev is generally suitable for this purpose. The output of the discriminator 11 is AND gated in the AND gate 12 with a voltage pulse having a nominal width of ten microseconds from the clock and sequence circuit 13. The output of the AND gate 12 triggers a single shot multivibrator circuit 14. The clock 13 is also synchronized with the neutron source 15. The pulse from the clock actuates a high voltage pulser (not illustrated) arranged to cause the neutron output of neutron source 15 to pulse at the clock frequency as described in U.S. Pat. No. 3,309,522.

The amplified pulses from the detector 10 are also coupled into the delay line 16, which is nominally set to cause a delay of .4 microseconds, the output of which is coupled into the three linear gates 17, 18 and 19.

The output of the single shot multivibrator 14 is coupled into the first gate on each of three AND gates 20, 21 and 22, respectively, the outputs of which are coupled into the linear gates 17, 18 and 19, respectively.

As previously mentioned, two of the inputs to the AND gate 12 are connected to the output of the clock 13 and the discriminator 11, respectively. The third gate of the AND gate 12 is connected to the $\bar{Q}$ output of the J-K flip-flop circuit 23. Such J-K flip-flop circuits are conventional and are discussed at length in U.S. Pat. No. 3,268,741. The steering terminal K is also connected to the $\bar{Q}$ output terminal. The output of the clock 13 is also connected to the "clear" input terminal 24 of the circuit 23. The clock pulse input terminal 25 of the J-K flip-flop circuit 23 (not to be confused with the clock 13) is connected to the output of an inverter which is driven by the decoder output "3" of the decoder 26 discussed hereinafter.

The output of the clock 13 is also connected to a reset generator 27 for resetting the scaler 28 which will also be discussed hereinafter.

The output of the AND gate 12 is connected to the scaler circuit 28. Such scaler circuits are conventional, and can be a pair of flip-flop multivibrators cascaded to provide a scale of four operation if desired. The four outputs of the scaler circuit 28 are connected into a "1 of 4 decoder" 26 for decoding the scaler circuit. The "0" output is unconnected on the decoder 26. The "1", "2" and "3" outputs of the decoder 26 are connected to the second inputs of the AND-gates 20, 21 and 22, respectively.

The output of linear gate 17 is connected to a pulse shaping circuit 30 and a resistor 31 and further into the line amplifier 32 and the output terminal 33. The output terminal 33 corresponds to a point which would normally be associated with the amplification and transmittal of pulses to the earth's surface in well logging utility.

The output of the linear gate 18 is connected through a delay line 34 to the pulse shaper circuit 35 and through the resistor 36 to the line amplifier 32. In a similar manner, the output of linear gate 19 is connected through the delay line 37 and the pulse shaper circuit 38 and through the resistor 39 to the line amplifier 32.

In the operation of the circuit of FIG. 1, it should be understood that the delay line 16 allows for the time required for the detector pulses to rise to the trigger level of the discriminator and for propagation times in the logic circuits. The clock pulse from the clock 13 enables the J-K flip-flop (an End Sequence circuit) in its high output state, and the first detector pulse above the discriminator threshold and within the gating interval from the clock produces an output from the AND gate 12 which triggers the single shot multivibrator 14 and also advances the scale of four decoder to position "1." Such action enables the AND gate 20 and thus the linear gate 17. The output of the linear gate 17 is passed through the pulse shaper circuit 30 to the line amplifier 32 for amplification and transmission to the earth's surface. The second detector pulse falling within the clock interval exceeding the discriminator threshold produces an output from the single shot and advances the scaler-decoder to position "2." The AND gate 21 and linear gate 18 are thus enabled and the detector pulse passes through the linear gate 18 and is delayed by delay line 34 before being shaped by the pulse shaper circuit 35 and being passed to the line amplifier 32. The third detector pulse falling within the clock interval which exceeds the discriminator threshold triggers the single shot multivibrator again and advances the decoder to position "3." The AND gate 22 and linear gate 19 are thus enabled and the detector pulse passes therethrough to be delayed by delay line 37 and shaped by the pulse shaper circuit 38 and amplified by the line amplifier 32. Also the inverted decoder output "3" causes the J-K flip-flop circuit to change state and disable the AND gate 12. The scale of four circuit 28 is reset to zero by the output of the reset generator 27 which occurs at some convenient time before the next clock pulse. It should be appreciated that even if less than three pulses occur during the clock interval, the AND gate 12 is disabled by the clock pulse going to zero.

For all of the pulses to be analyzed as individual pulses, it is desirable that the delay of delay lines 34 and 37 be slightly longer than the longest dead time in the system. This may be the line dead time or the pulse pair resolving time of the surface equipment (not illustrated). The shaper circuits are included to compensate for perturbations caused by the delay lines. The system is adjusted initially by feeding a standard pulse to the input, coinciding with the output of the detector 10, and adjusting the shaper circuits so that the pulse falls in the same channel of the surface analyzing equipment regardless of the channel it passes through in the subsurface system.

Figure 2:
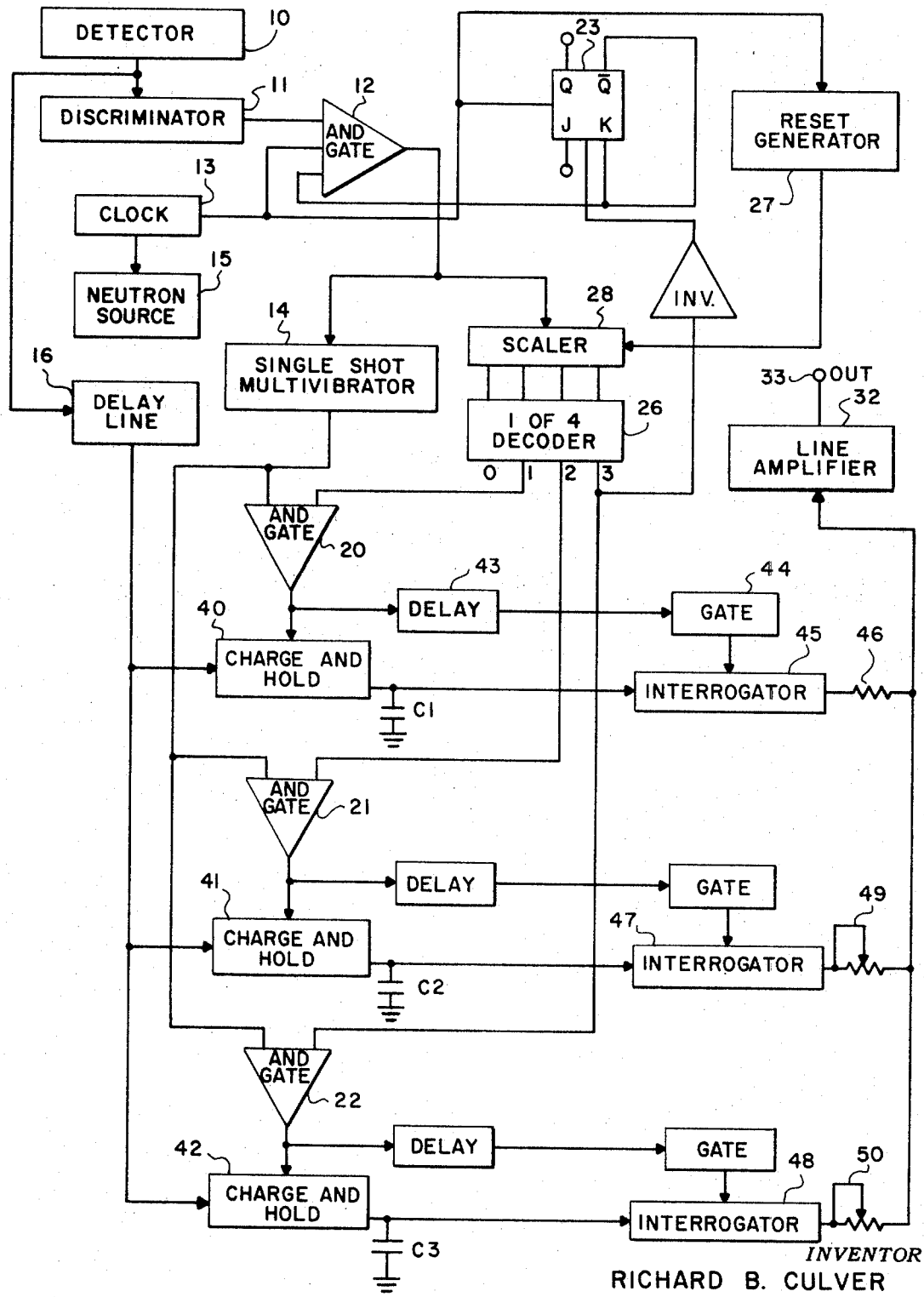
FIG. 2 is a block circuit diagram of an alternative embodiment of the invention.

Delay lines of long delay, for example 10 to 100 microseconds, are physically large if good pulse fidelity is to be maintained; therefore, an alternate means for accomplishing the delay is shown in FIG. 2 hereinafter.

Referring now to FIG. 2, the charge and hold circuits 40, 41 and 42 replace the linear gates 17, 18 and 19 as illustrated with respect to FIG. 1, respectively. The charge and hold circuits 40, 41 and 42 are connected to the outputs of the AND gates 20, 21 and 22, respectively. The output of the AND gate 20 is also connected to a delay circuit 43 which may be a delay line or a single shot multivibrator which in turn is connected to a gate 44, for example, a single shot multivibrator, which is used to gate an interrogator circuit 45. A capacitor C1 is associated with the charge and hold circuit 40 for the storage of any detector pulse appearing in the circuit 40. The interrogator circuit 45, for example a linear gate circuit, also has means for discharging the capacitor C1 in a manner known in the art since such interrogator circuits are conventional. The output of the interrogator circuit 45 is coupled through a resistor 46 to the line amplifier 32.

In a similar manner, the output of the AND gate 21 is connected through a similar delay and gate circuit into the interrogator 47. Likewise, the output of AND gate 22 is connected to a delay circuit and a gate circuit into the interrogator circuit 48. The output of interrogator circuit 47 is connected through a variable resistor 49 to the line amplifier 32. The output of interrogator circuit 48 is similarly connected through a variable resistor 50 to the line amplifier 32.

In the operation of FIG. 2, it should be appreciated that its operation is very similar to that of FIG. 1. The clock pulse enables the J-K flip-flop in its high output state and the first detector pulse appearing within the clock interval and above the discriminator threshold produces an output from the single shot multivibrator 14 and also advances the decoder circuit 26 to position "1." The charge and hold circuit 40 is activated and the capacitor C1 is charged to the peak value of the detector pulse. Also, delay circuit 43, for example a single shot multivibrator, is triggered which in turn triggers the gate circuit 44 which in turn activates the interrogator 45 and the resulting output is coupled to the line amplifier 32. The second detector pulse falling within the clock interval and exceeding the discriminator threshold produces an output from the single shot multivibrator 14 and advances the decoder to position "2." The charge and hold circuit 41 is activated and the capacitor C2 is charged to the peak value of the detector pulse. Also the delay circuit associated with the AND gate 21 and its associated gate is triggered which activates the interrogator 47 and the resulting output is fed to the line amplifier 32. The third detector pulse is processed by the interrogator 48 in a similar manner. The decoder output "3" causes the J-K flip-flop to change state and disable the AND gate 12.

The delay of the delay circuit 43 can be short, but the delay of the delay circuits associated with the outputs of the AND gates 21 and 22, respectively, should be slightly longer than the longest dead time in the system.

If identical circuits are used in each channel, and if the interrogator aperature width is the same for all channels, the output of the interrogators will differ only by the amount of charge that leaks off the hold capacitors C1, C2 and C3 due to circuit imperfections. Compensation for this is made by adjusting the value of the line amplifier input resistor for each channel, such as by adjusting the resistors 49 and 50. The initial adjustment is made by feeding a standard pulse to all channels, adjusting the resistor in each channel so that all pulses are resolved the same by the surface equipment. With carefully designed circuits, long delays and accurate reproduction of the detector pulses result.

For ease of illustration, the circuits in FIG.'s 1 and 2 have been described for processing a maximum of three detector pulses per gating interval. It should be appreciated, however, that more or less pulses can be processed by a different number of channels. The length of the gating interval and the decay time of the detector will determine the maximum. This method has been shown to greatly increase the data rate when fast detectors are used, such as with solid state or other fast detectors.

It it is desirable to process all detector pulses, the discriminator is set just above the noise level. However, additional pulse selection can be made by adjusting the threshold to eliminate undesirable low energy pulses.

I claim:

1. In a radioactivity well logging system having a pulsed neutron source and a radioactivity detector wherein electrical pulses tend to pile up within the system, the improvement comprising means to selectively gate and transmit to the earth's surface a first electrical pulse indicative of detected radiation following the commencement of each neutron source pulse and to gate a second such electrical pulse and to transmit said second electrical pulse to the earth's surface only after a predetermined delay following the transmission of said first electrical pulse.

2. In the system according to claim 1, said selective gating means being further characterized as being synchronized with the pulsing of said neutron source.

3. In the system according to claim 2, said selective gating means being further characterized as including means to discriminately gate only those pulses having a predetermined characteristic.

4. In the system according to claim 3, wherein said predetermined characteristic is functionally related to the energy level of gamma rays of interest emanating from the formations surrounding the well bore.

5. In a radioactivity well logging system having a pulsed neutron source and a radioactivity detector wherein electrical pulses tend to pile up within the system, the improvement comprising means to selectively gate a plurality of electrical pulses indicative of detected radiation following the commencement of each neutron source pulse, said means including delay means for introducing predetermined delays between said electrical pulses prior to their transmission to the earth's surface.

6. In the system according to claim 5, said selective gating means being further characterized as being synchronized with the pulsing of said neutron source.

7. In the system according to claim 6, said selective gating means being further characterized as including means to discriminately gate only those pulses having a predetermined characteristic.

8. In the system according to claim 7, wherein said predetermined characteristic is functionally related to the energy level of gamma rays of interest emanating from the formations surrounding the well bore.

9. In an electrical circuit in which electrical pulses are cyclically associated with a synchronized event, the improvement comprising:

clock means for producing a series of synchronizing gate pulses;

an input terminal for receiving electrical pulses associated with said synchronizing gate pulses;

delay means connected to said input terminal;

a first electrical AND gate having one of its three inputs connected to said input terminal;

a J-K flip-flop circuit having a first input steering terminal, a clearing input terminal and a clock input terminal and providing an output signal at an output terminal of said flip-flop circuit, said clearing input terminal being connected to said clock means and also to the second input of said first AND gate and said input steering terminal of said J-K flip-flop circuit being connected to the output terminal of said flip-flop circuit and to the third input of said first AND gate;

a plurality of additional AND gates having two inputs each;

a single shot multivibrator connected to, and driven by, the output of said first AND gate, the output of said multivibrator being connected to the first input of each of said additional gates for triggering said gates;

a scaler-decoder connected to the output of said multivibrator, the outputs of said decoder being connected to the second inputs of said additional gates, respectively, the last used decoder output being connected to said clock input terminal of said J-K flip-flop circuit;

a plurality of linear gates, each of which is connected to the output of said delay means, and such linear gates being connected to be triggered by the outputs of the plurality of additional AND gates, respectively; and an output terminal connected to the outputs of said linear gates.

10. The circuit according to claim 9, including in addition thereto, a reset generator for resetting said scaler-decoder in synchronization with said clock pulses.

11. The circuit according to claim 10, including in addition thereto, additional delay means connected to the outputs of at least one of said linear gates.

12. In an electrical circuit in which electrical pulses are cyclically associated with a synchronized event, the improvement comprising:

clock means for producing a series of synchronizing gate pulses;

an input terminal for receiving electrical pulses associated with said synchronizing gate pulses;

delay means connected to said input terminal;

a first electrical AND gate having one of its three inputs connected to said input terminal;

a J-K flip-flop circuit having a first input steering terminal, a clearing input terminal and a clock input terminal and providing an output signal at an output terminal of said flip-flop circuit, said clearing input terminal being connected to said clock means and also to the second input of said first AND gate and said input steering terminal of said J-K flip-flop circuit being connected to the output terminal of said flip-flop circuit and to the third input of said first AND gate;

a plurality of additional AND gates having two inputs each;

a single shot multivibrator connected to, and driven by, the output of said first AND gate, the output of said multivibrator being connected to the first input of each of said additional gates for triggering said gates;

a scaler-decoder connected to the output of said multivibrator, the outputs of said decoder being connected to the second inputs of said additional gates, respectively, the last used decoder output being connected to said clock input terminal of said J-K flip-flop circuit;

a plurality of charge and hold circuits, each of which is connected to the output of said delay means, and such charge and hold circuits being connected to be triggered by the outputs of the plurality of additional AND gates, respectively;

means to interrogate said charge and hold circuits; and an output terminal connected to said interrogator means.

13. The circuit according to claim 12 wherein said interrogator means includes a separate interrogator circuit for each of said plurality of charge and hold circuits.

14. The circuit according to claim 13, including in addition thereto, means to gate said separate interrogator circuits connected to the outputs of said additional AND gates.

15. The circuit according to claim 14, including in addition thereto, discriminator means between said input terminal and said first AND gate.

* * * * *